(12) United States Patent
Murray

(10) Patent No.: US 8,547,608 B2
(45) Date of Patent: Oct. 1, 2013

(54) SCANNING APPARATUS WITH CIRCUIT BOARD OVERLAPPING PLATEN

(75) Inventor: Richard A. Murray, San Diego, CA (US)

(73) Assignee: Eastman Kodak Company, Rochester, NY (US)

(*) Notice: Subject to any disclaimer, the term of this patent is extended or adjusted under 35 U.S.C. 154(b) by 323 days.

(21) Appl. No.: 13/028,433

(22) Filed: Feb. 16, 2011

(65) Prior Publication Data

US 2012/0206750 A1 Aug. 16, 2012

(51) Int. Cl.
*H04N 1/04* (2006.01)

(52) U.S. Cl.
USPC ............ 358/497; 358/474; 358/494; 358/498

(58) Field of Classification Search
USPC ................. 358/497, 474, 494, 498, 482, 471
See application file for complete search history.

(56) References Cited

U.S. PATENT DOCUMENTS

| | | | |
|---|---|---|---|
| 5,875,042 A | 2/1999 | Kashitani et al. | |
| 6,330,084 B1 * | 12/2001 | Chiang | 358/497 |
| 6,377,382 B1 | 4/2002 | Kato | |
| 2005/0219651 A1 | 10/2005 | Uchida et al. | |
| 2007/0030534 A1 * | 2/2007 | Ikeno et al. | 358/498 |
| 2008/0180755 A1 | 7/2008 | Bokelman et al. | |
| 2009/0034019 A1 | 2/2009 | Hill et al. | |
| 2009/0190190 A1 | 7/2009 | Yamauchi | |
| 2009/0237748 A1 | 9/2009 | Yabuta | |

\* cited by examiner

*Primary Examiner* — Houshang Safaipour
(74) *Attorney, Agent, or Firm* — Peyton C. Watkins

(57) ABSTRACT

A scanning apparatus includes: a transparent platen having a first edge and a second edge opposite the first edge, the first and second edges being separated along a scan direction; a frame including: a holder for the transparent platen; and a control panel located proximate the first edge of the transparent platen; a scan bar assembly including a scan element; a motor for moving the scan bar assembly along the scan direction; and a circuit board connected to the control panel, the circuit board including: a plurality of electrical components; a first edge located adjacent a side of the frame; and a second edge opposite the first edge, wherein the second edge of the circuit board is configured to overlap the first edge of the transparent platen.

21 Claims, 17 Drawing Sheets

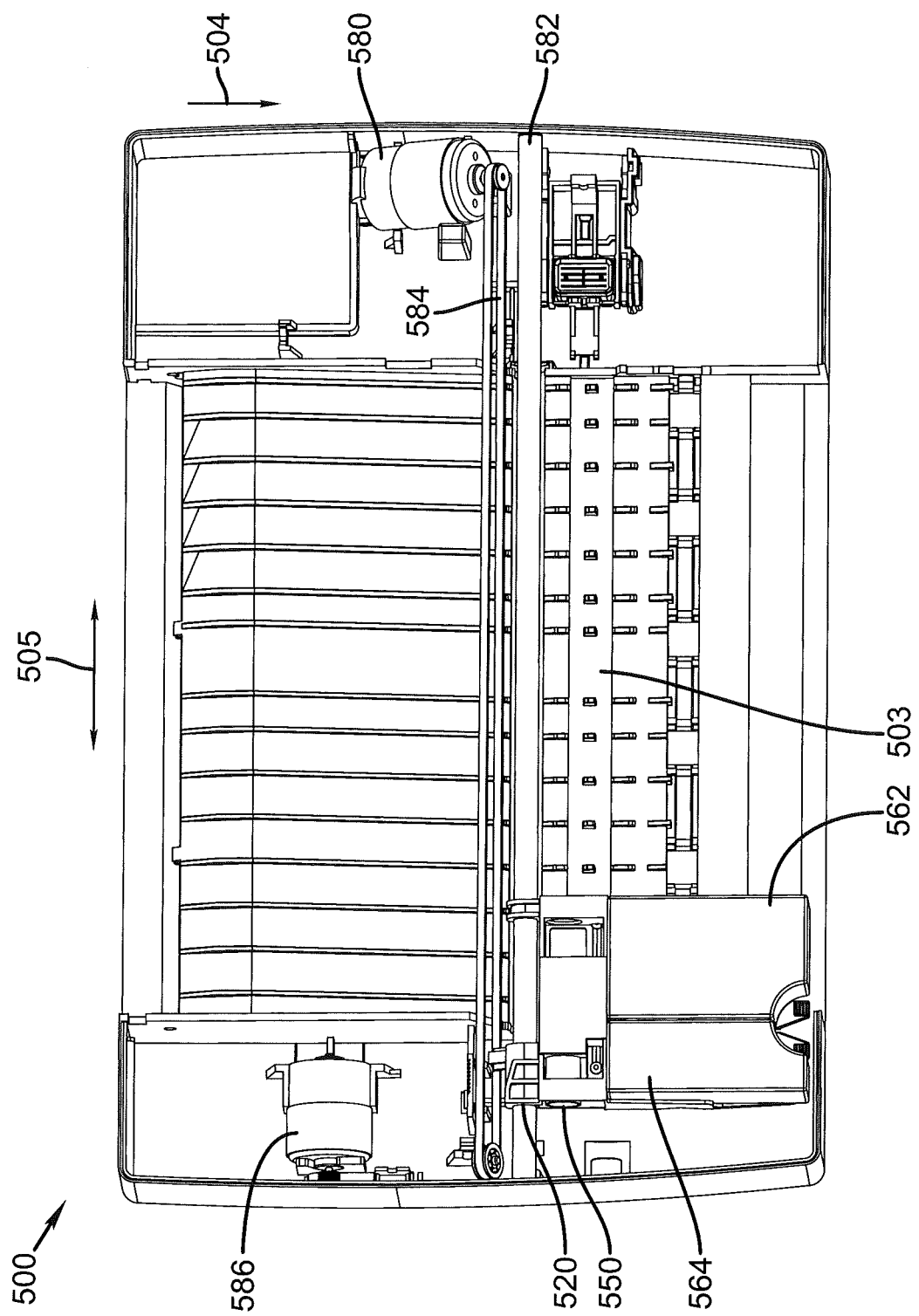

SCANNING APPARATUS WITH CIRCUIT BOARD OVERLAPPING PLATEN

CROSS REFERENCE TO RELATED APPLICATIONS

Reference is made to commonly assigned, co-pending U.S. patent application Ser. No. 12/842,074, filed Jul. 23, 2010, entitled: "Compact Housing for a Scan Bar Assembly"; and U.S. patent application Ser. No. 13/028,417, filed Feb. 16, 2013, entitled: "Obliquely Mounted Motor on Scan Bar Assembly", the disclosures of which are incorporated herein by reference.

FIELD OF THE INVENTION

The present invention relates to an optical scanning apparatus, and more particularly to the configuration of a control circuit board relative to an edge of the platen.

BACKGROUND OF THE INVENTION

Optical scanners operate by imaging an object (e.g. a document) with a light source, and sensing a resultant light signal with an optical sensor array. Each optical sensor or photoreceptor in the array (typically a linear array) generates a data signal representative of the intensity of light impinged thereon for a corresponding portion of the imaged object. The data signals from the array of sensors are then processed (typically digitized) and stored in a temporary memory such as a semiconductor memory or on a hard disk of a computer, for example, for subsequent manipulation and printing or display, such as on a computer monitor. The image of the scanned object is projected onto the optical photo sensor array incrementally by use of a moving scan line. The moving scan line is produced either by moving the document with respect to scan bar assembly that includes the array of optical sensors, or by moving the scan bar assembly relative to the document. Either or both of these methods may be embodied in a flat bed scanner, multi-function printer, or any scanner having manual and automatic feed capabilities.

A common type of scanner uses a contact image sensor (CIS) scan bar. A CIS scan bar includes a contact image sensor scan element having a length that is substantially equal to the width of the scanning region. The photoreceptors in a CIS are substantially the same size as the pixel resolution of the scanner. The CIS has a short depth of field and is typically mounted beneath the transparent platen (scanner glass) upon which the document is placed. A scan bar assembly includes the CIS scan element, as well as gears for power transmission to move the scan bar assembly. One or more roller spacers in the CIS scan bar assembly are biased against the bottom of the scanner glass so that the CIS scan element is always at substantially the same distance from the top of the scanner glass.

US Patent Application Publication 2009/0034019 describes a scanner module including the optical components, where the scanner module is carried by a carriage that includes a motor and associated gears. FIG. 1 (prior art) is a copy of FIG. 2 of US Patent Application Publication 2009/0034019 and FIG. 2 (prior art) is a copy of FIG. 4 of US Patent Application Publication 2009/0034019. Scanner 120 includes platen 122, carriage 124, wheels 126, bias 128, drive 130, light source 132, reflected light capture unit 134, and sensor array (not shown). Light source 132, reflected light capture unit 134 and the sensor array are joined to one another to form a scanner module 135 which includes a body 204 and wheels 126. Module 135 is carried by carriage 124. Platen 122 includes a plate, at least a portion of which is transparent, configured to support on its top surface 144 a document or other article to be scanned. Central portion 200 comprises that portion of platen 122 through which light is transmitted and through which reflected light passes. Side portions 202 may be transparent or may be opaque. Side portions 202 provide surfaces against which wheels 126 rotate. Carriage 124 carries reflected light gathering unit 134, light source 132 and the sensor array as they are moved across and along platen 122. Scan module 135 includes body 204 and two opposing wheel wells 206 that are sized to receive wheels 126, which are retained by caps 210. Bias 128 includes one or more members, such as wheels 214, configured to resiliently urge carriage 124, wheels 126 and reflected light gathering unit 134 towards platen 122. As a result, wheels 126 are maintained in constant contact with surface 152 as carriage 124 is moved across platen 122. Wheels 214 are urged against a stationary surface 216 (schematically shown) associated with the housing of scanner system 120. Drive 130 is configured to move carriage 124 in either direction as indicated by arrows 158 (called the scan direction herein). Drive 130 moves carriage 124 and reflected light gathering unit 134 across platen 122 such that a document may be scanned. In the example shown in FIGS. 1 and 2, drive 130 includes motor 220, worm gear 224, drive gear 225, pinion gears 226, 228 and rack 230 (schematically shown in FIG. 1). Motor 220 is carried by carriage 124 and is connected to an encoder (not shown). Worm gear 224 is in engagement with drive gear 225 which is part of a compound gear also including pinion gear 226. Pinion gears 226 and 228 are in engagement with rack 230. Rotation of pinion gears 226, 228 results in carriage 124 being driven along rack 230 relative to platen 122. Because scanner module 135 (FIG. 2) is made separately from carriage 124 (FIG. 1), some means of affixing scanner module 135 to carriage 124 is required. Visible in FIG. 1, but not originally labeled in US Patent Application Publication 2009/0034019 are bolts 125 for attaching scanner module 135 to carriage 124. Also originally unlabeled in FIG. 1 of US Patent Application Publication 2009/0034019 (but identifiable by one who is familiar with conventional scan bar designs) is gear retainer tab 127, which is typically formed of a piece of stamped metal that is bolted to carriage 124 with one of the bolts 125. A further component that is unlabeled in US Patent Application Publication 2009/0034019 but that is readily identifiable in FIG. 1 is motor printed circuit board 221 that is used for connecting power to motor 220 and for attaching the rotary encoder sensor that monitors rotation of the motor axle.

Conventional scanners typically also include a printed circuit board (not shown in FIG. 1) that is displaced from an edge (for example the edge pointed to by the arrow indicating platen 122) of platen 122. Such a circuit board provides the electronics for a control panel for the scanner, for example. In many applications the overall width of the scanning apparatus is determined by other factors, so that a printed circuit board that is displaced from an edge of the platen presents no problems. However, in some applications, the width of the scanning apparatus is constrained by the serial stack up of the width of the platen combined with the scan module, and the width of the printed circuit board. A reduction in the size of the scanning apparatus is a direct benefit to the user in that a smaller scanning apparatus takes up less room in the workspace. In addition, a smaller scanning apparatus leads to lower cost of the unit.

What is needed is a configuration of the platen and the printed circuit board that provides the required scanning area as well as contact regions near the end of travel for the wheels or other bearing features of the scan module, while enabling a reduced width of the scanning apparatus.

SUMMARY OF THE INVENTION

The present invention is directed to overcoming one or more of the problems set forth above. Briefly summarized, according to one aspect of the invention, the invention resides in a scanning apparatus includes: a transparent platen having a first edge and a second edge opposite the first edge, the first and second edges being separated along a scan direction; a frame including: a holder for the transparent platen; and a control panel located proximate the first edge of the transparent platen; a scan bar assembly including a scan element; a motor for moving the scan bar assembly along the scan direction; and a circuit board connected to the control panel, the circuit board including: a plurality of electrical components; a first edge located adjacent a side of the frame; and a second edge opposite the first edge, wherein the second edge of the circuit board is configured to overlap the first edge of the transparent platen.

BRIEF DESCRIPTION OF THE DRAWINGS

FIG. 17 is a top view of a printing mechanism that can be integrated together with the scanner unit of FIGS. 8-10 to provide a multi-function printer.

DETAILED DESCRIPTION OF THE INVENTION

Figure 2:
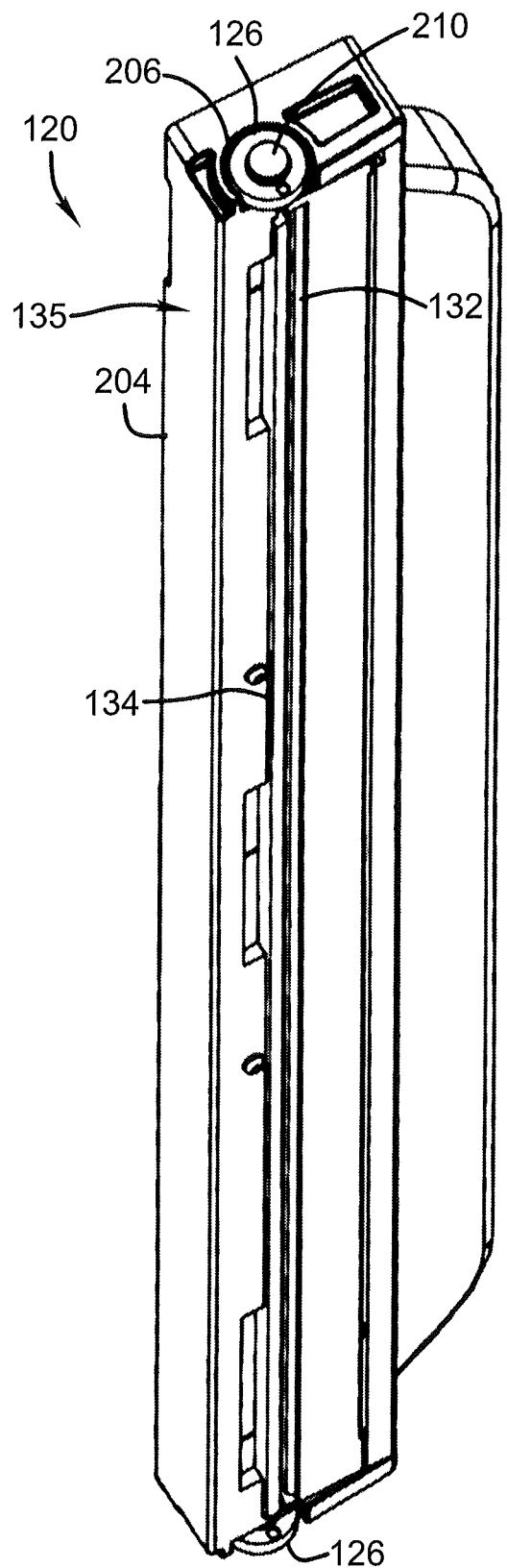
FIG. 2 shows a top perspective view of a scanner module of the prior art scanner of FIG. 1.
Figure 3:
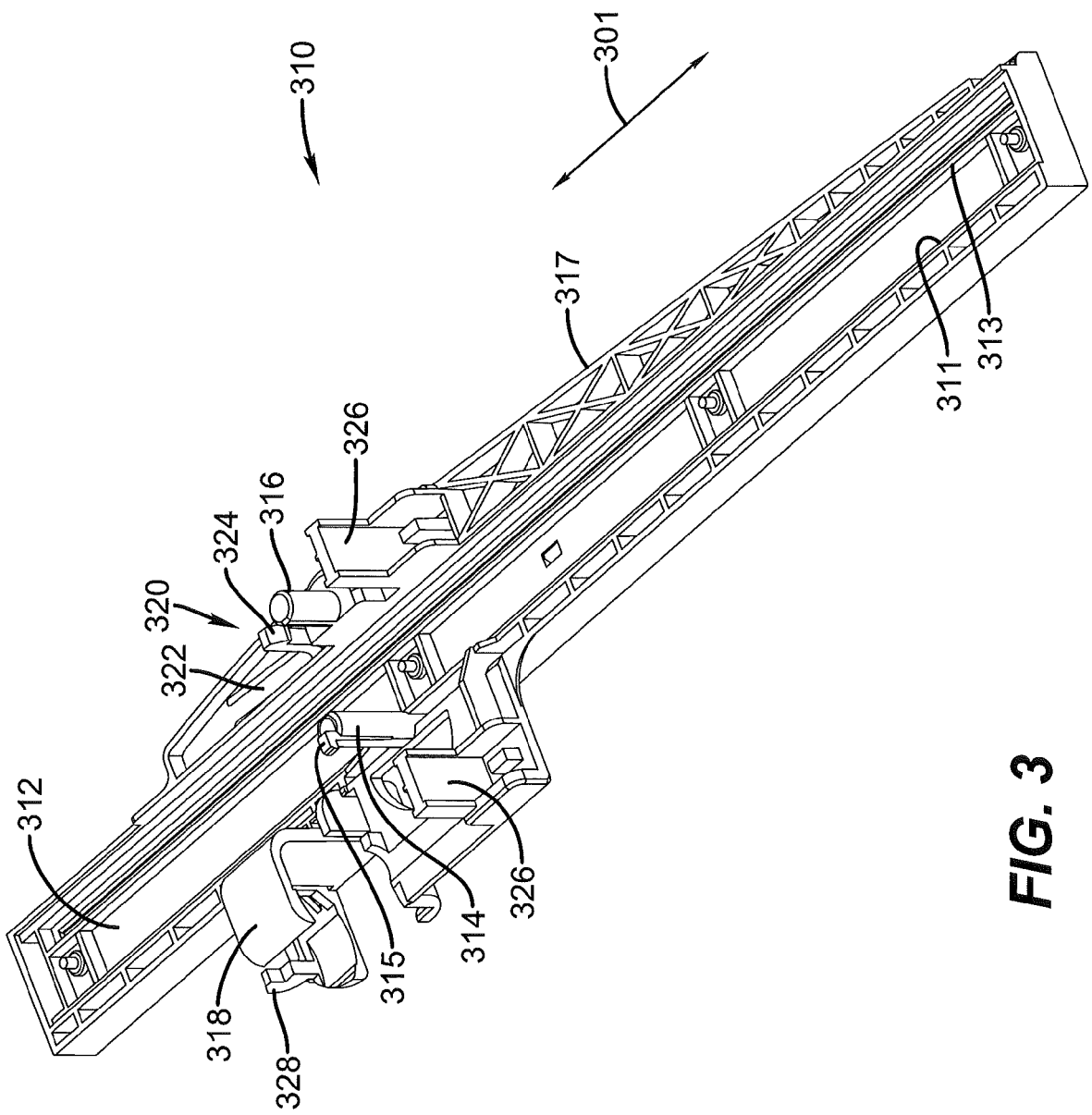
FIG. 3 is a bottom perspective view of a housing for a scan bar assembly.
Figure 4:
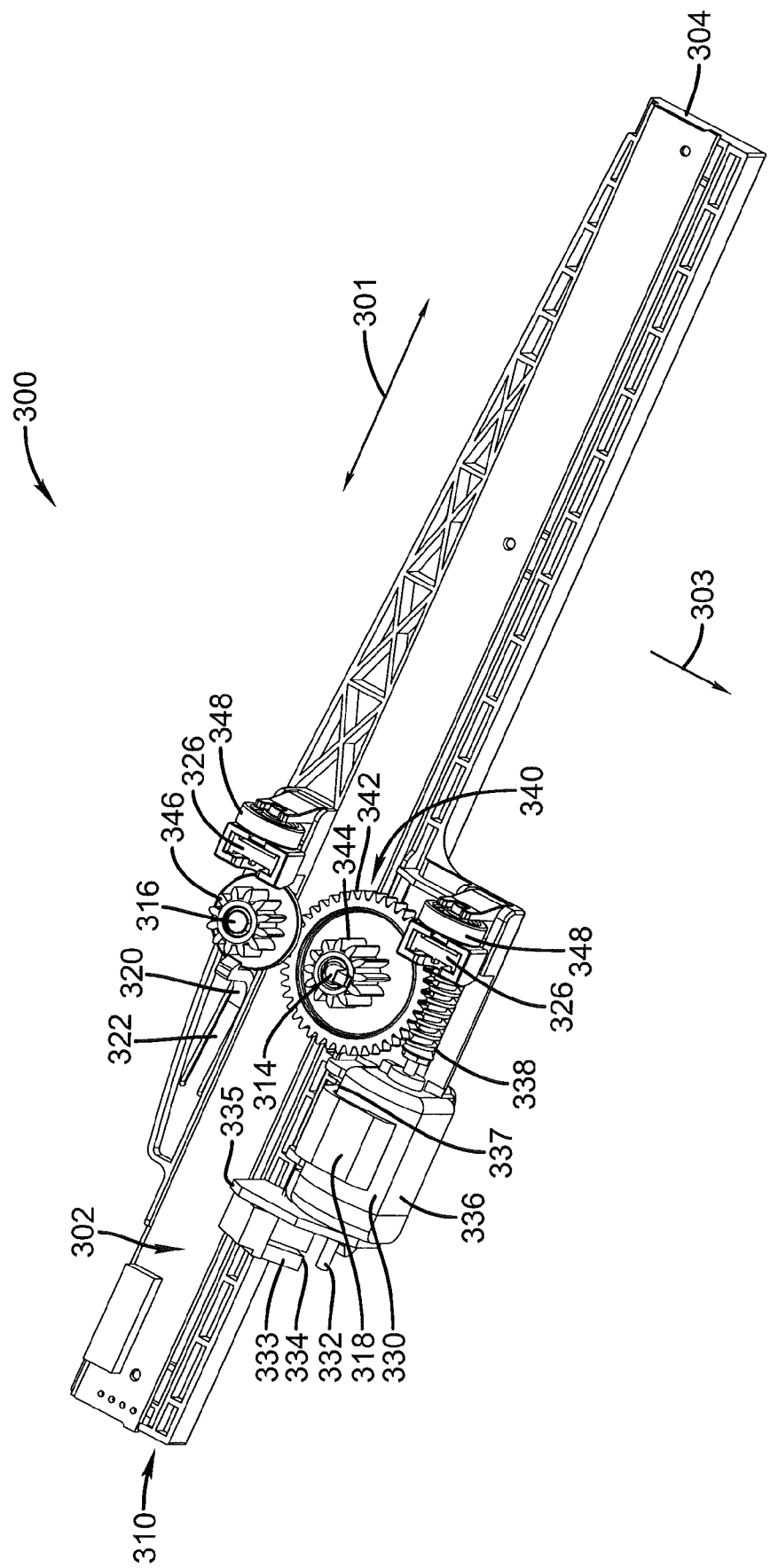
FIG. 4 is a bottom perspective view of a scan bar assembly including components mounted onto the housing of FIG. 3.
Figure 7:
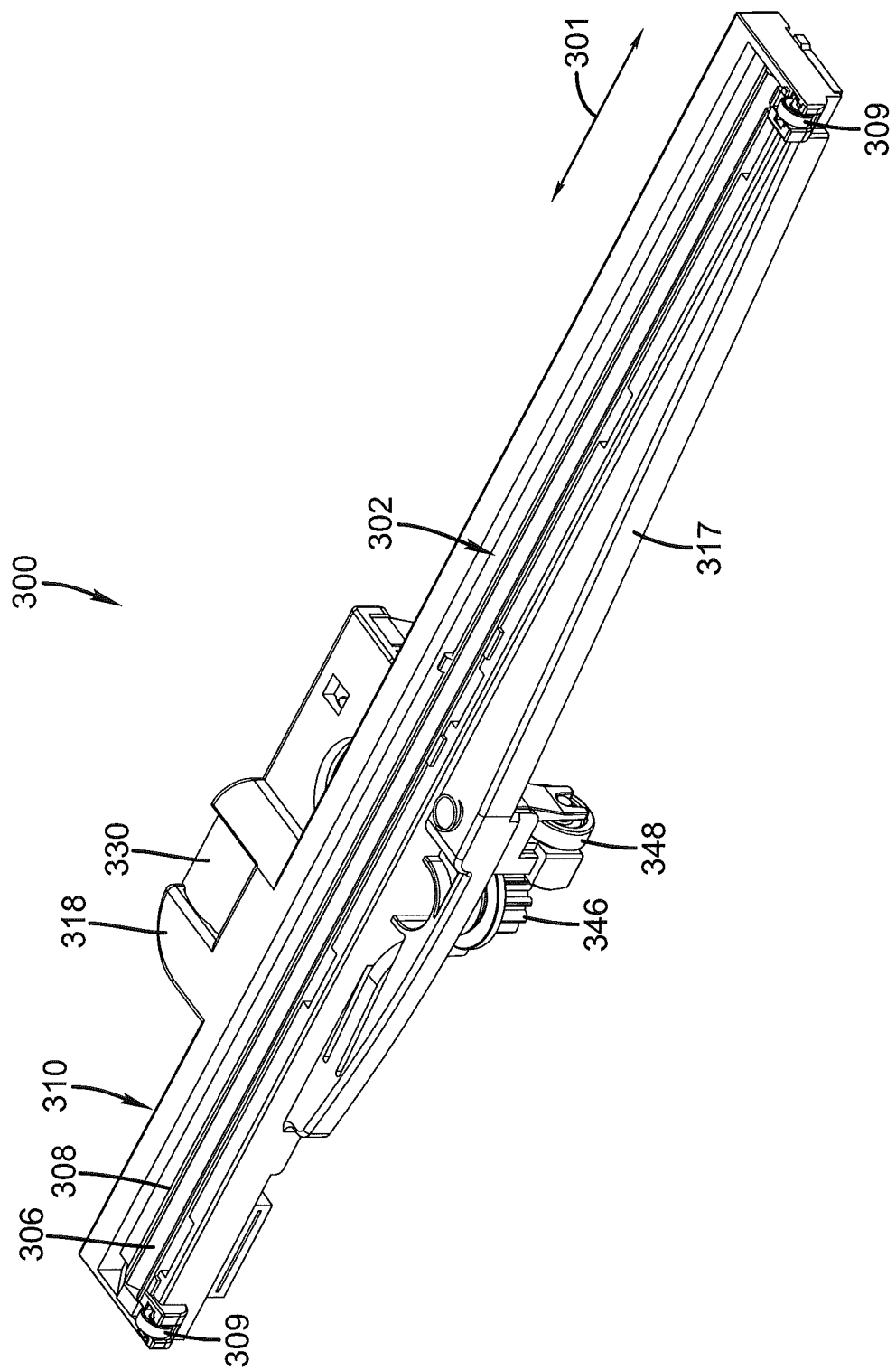
FIG. 7 is a top perspective view of a portion of the scan bar assembly shown in FIG. 4.

FIG. 3 is a bottom perspective view of a housing 310 for a scan bar assembly 300 (see FIG. 4). Housing 310 includes a mounting region 312 for a scan element 302 (see FIGS. 4 and 7), a first mounting member 314 for a drive gear 340 (see FIG. 4), a second mounting member 316 for a follower gear 346 (see FIG. 4) and a clip 318 for mounting a motor 330 (see FIG. 4). In other words, housing 310, which can be integrally formed as a single part by injection molding, for example, is configured for attachment of the optical components as well as the power transmission components for moving the scan bar assembly 300. Therefore it is not required to bolt together a scan module containing optical components and a carriage containing power transmission components as in the prior art shown in FIGS. 1 and 2. In addition to facilitating assembly of the scan bar, using a single integrally formed housing for the optical components and the power transmission components also provides tighter tolerances in the relative location and orientation of the scan element and the gears that control its motion within the scanner. Mounting region 312 includes a first wall 311 and a second wall 313 that is opposite the first wall 311. The first mounting member 314 is located near first wall 311, and the second mounting member 316 is located near second wall 313. In the example shown in FIG. 3, housing 310 includes an outer wall 317 that is located near second wall 313. Unlike first wall 311 and second wall 313, which are substantially parallel to length direction 301, outer wall 317 is bowed outwardly in the region near second mounting member 316 and then tapers toward its ends, as also shown in FIG. 7.

Figure 1:
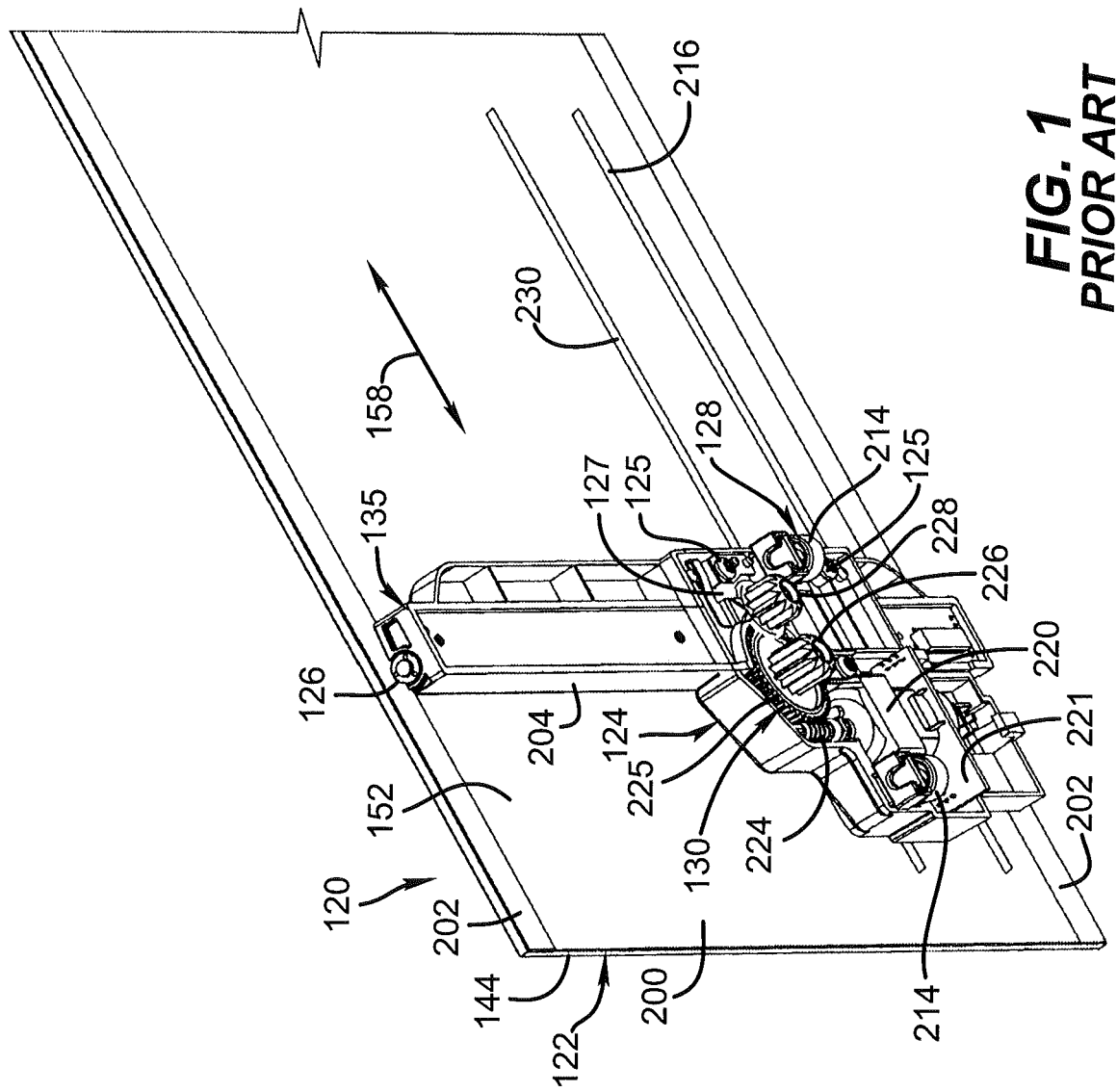
FIG. 1 shows a scanner according to prior art.

Other features that are integrally formed with housing 310 and that are shown in FIG. 1 are a gear retention member 320, including a cantilevered arm 322 and an end 324 located near the second mounting member 316; a pair of roller mount extensions 326; a support 328 for the motor printed circuit board, and a gear retaining member 315. The provision of these features in a single part housing 310 helps to reduce manufacturing cost in terms of parts count and ease of assembly. In addition, as described below, the locations provided for components that are assembled onto housing 310 enable a reduction in the width of the scan bar assembly.

FIG. 4 shows a bottom perspective view of scan bar assembly 300, which includes housing 310 of FIG. 3, plus optical and power transmission components assembled onto it. Scan element 302 is mounted in mounting region 312 (see FIG. 3), and includes a printed circuit board 304, as well as a light source 306 and a lens 308 that are shown in the top view of FIG. 7, and a photoreceptor array (not shown). Scan element 302 extends along length direction 301, along which also the photoreceptor array (not shown) extends. The scan direction 303 along which the scan bar assembly 300 is moved during scanning an image is also indicated, and is substantially perpendicular to length direction 301. Motor 330 is snap fitted into clip 318 and includes an axle 332. Near one end of axle 332 is an encoder sensor 333 that includes a slot 334 through which an encoder wheel (not shown) passes in order to monitor the rotation of axle 332. Encoder sensor 333 is mounted on a printed circuit board 335 that also provides power to motor 330. On the other end of axle 332 is mounted worm gear 338. Drive gear 340 is a compound gear that is mounted on first mounting member 314. Drive gear 340 includes a first gear 342 that is engaged with worm gear 338. Drive gear 340 also includes a second gear 344 that is coaxial with first gear 342. Follower gear 346 is mounted on second mounting member 316. A pair of idle rollers 348 are mounted respectively on roller mount extensions 326 (see FIG. 3). Optionally a spring bias is provided to the idle roller 348 that is closest to follower gear 346 in order to push spacer wheels 309 (see FIGS. 7 and 10) into contact with the underside of the platen glass.

Motor 330 includes an innermost side 337 that is located near first wall 311 of housing 310, and an outermost side 336 that is located opposite the innermost side 337. In the scan bar assembly configuration of FIGS. 3 to 7, as described in U.S.

patent application Ser. No. 12/842,074, the outermost side 336 and innermost side 337 of motor 330 are substantially parallel to length direction 301 of scan element 302. In order to reduce the width of the scan bar assembly 300, relative to the prior art shown in FIG. 1, along a direction parallel to the scan direction 303, the idle roller 348 and corresponding roller mount extension 326 closest to the motor 330 is positioned so that it does not extend beyond the outermost side 336 of the motor 330, in contrast to the prior art shown in FIG. 1. In addition in FIG. 4 it can be seen that the printed circuit board 335 for motor 330 is also positioned so that it does not extend beyond the outermost side 336 of motor 330. In fact, as seen in FIGS. 4 and 7, no component of scan bar assembly 300 that is mounted on housing 310 extends beyond outermost side 336 of motor 330. In this way it has been found possible to reduce the width of the scan bar assembly 300 along a direction parallel to scan direction 303 to six centimeters or less.

Figure 5:
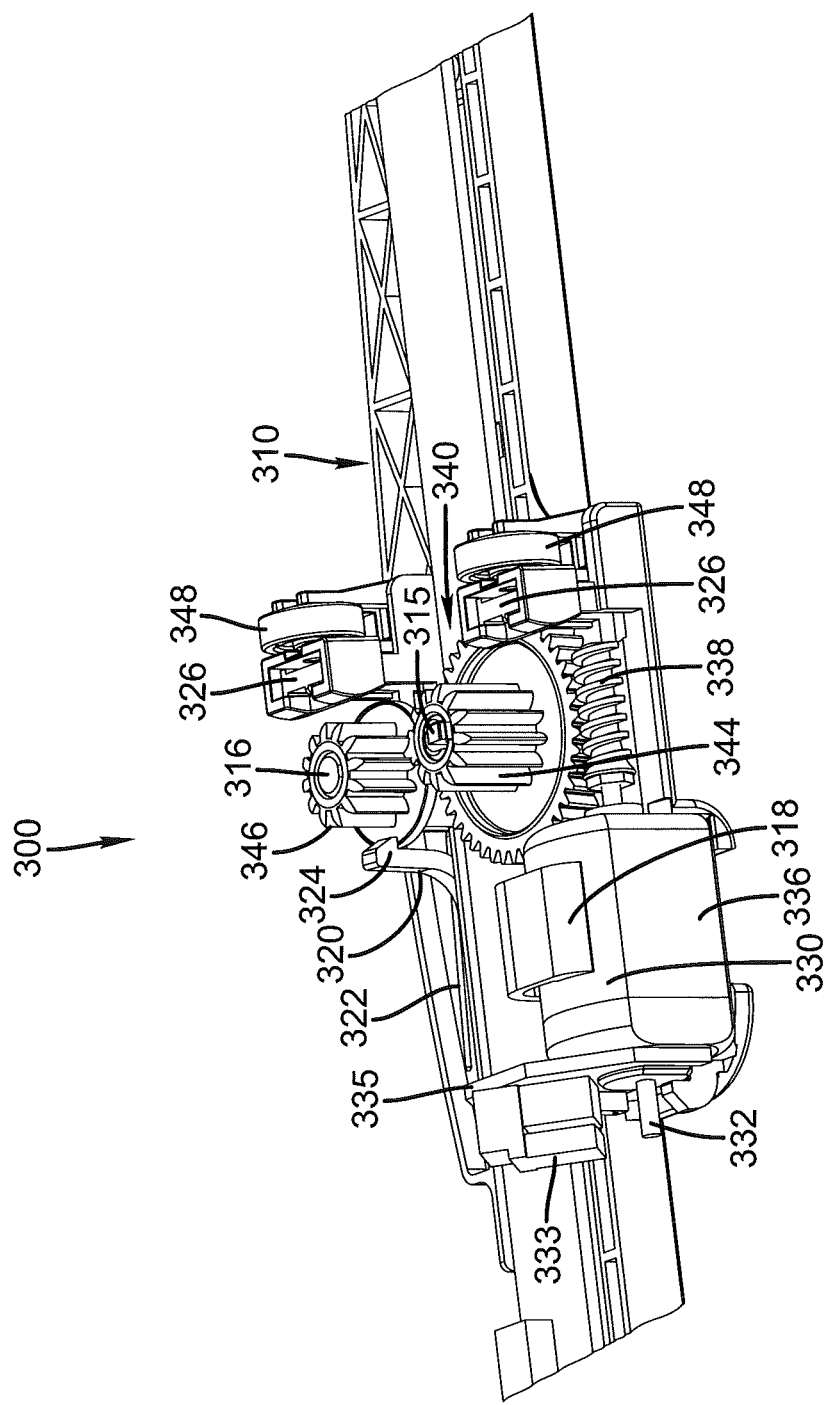
FIG. 5 is a close-up bottom perspective view of a portion of the scan bar assembly shown in FIG. 4.
Figure 6:
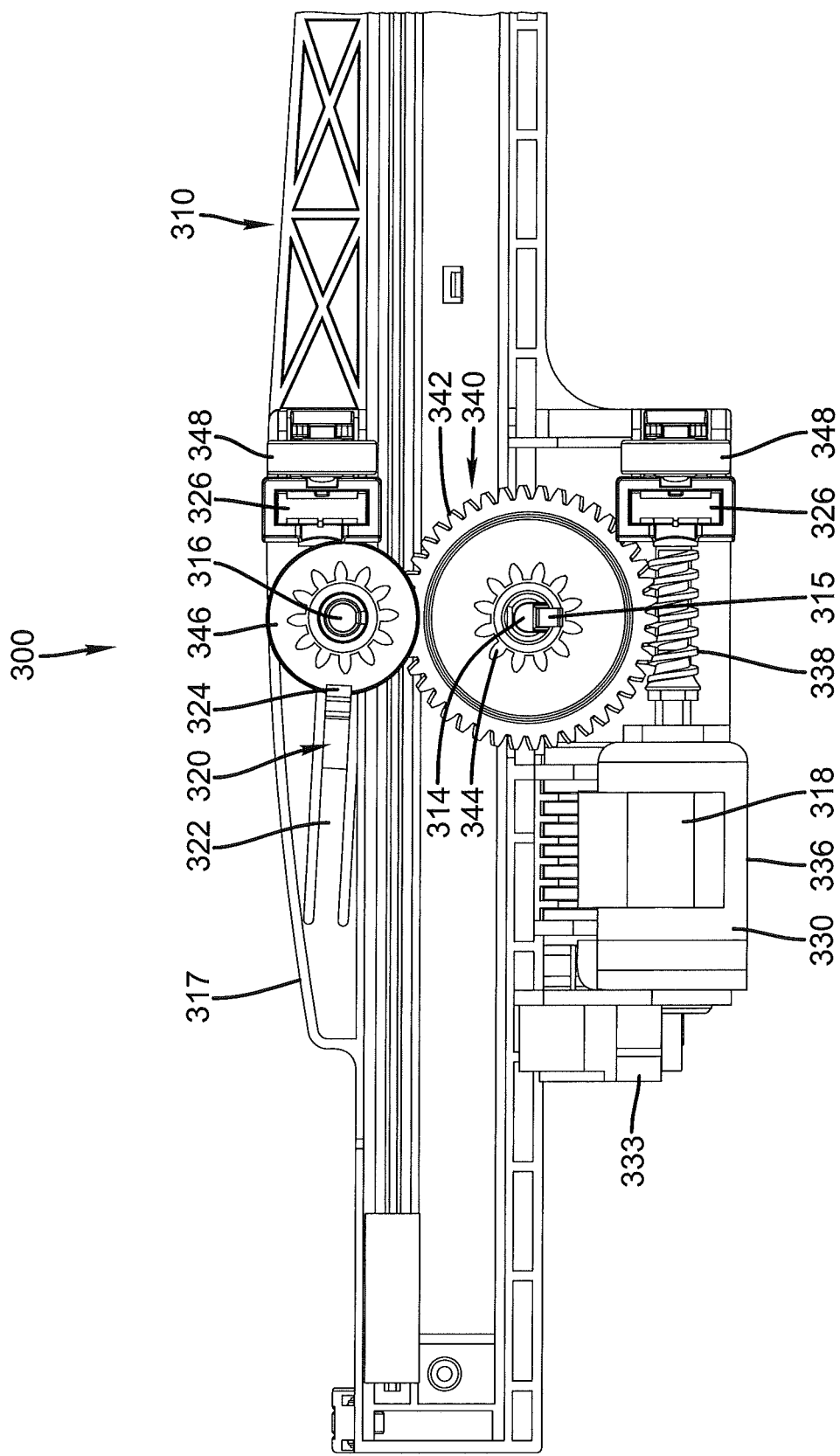
FIG. 6 is a close-up bottom view of a portion of the scan bar assembly shown in FIG. 4.

FIG. 5 provides a close-up perspective bottom view that is rotated somewhat relative to FIG. 4, in order to more clearly show the power transmission portion of scan bar assembly 300. FIG. 6 is a close-up bottom view that shows some of the same features, but at a different angle. The end 324 of gear retention member 320 is shown in contact with a rim of follower gear 346. Cantilevered arm 322 of gear retention member 320 provides a spring force so that end 324 in contact with gear retention member 320 provides a frictional drag on follower gear 346 that helps to smooth the motion of the scan bar assembly 300. A similar function is provided by prior art gear retainer tab 127 (see FIG. 1). However, gear retainer tab 127 is formed of stamped metal and is an additional component that must be assembled onto the prior art scan bar assembly. Integrally formed gear retention member 320 of the present invention provides the functions of holding the follower gear 346 in place and providing a frictional load without requiring an additional component to be assembled onto housing 310. Also shown in FIGS. 5 and 6 is gear retaining member 315 (see also FIG. 3) that is located near the axis of rotation of the drive gear 340 and that helps to keep drive gear 340 attached to housing 310.

FIG. 7 shows a top perspective view of scan bar assembly 300. Such a top perspective view is what would be seen if one opened the lid of a scanner and looked through the scanner glass. The optical components of scan element 302 are positioned near the top side of scan bar assembly 300. Light source 306 provides illumination to the document to be scanned. Reflected light is gathered through lens 308 and directed to a linear photoreceptor array (not shown, but oriented along length direction 301). Spacer wheels 309 at each end of scan bar assembly 300 are pushed into contact with the bottom surface of the scanner glass by the spring mounted idle roller 348 located near follower gear 346. Motor 330 and a portion of its associated mounting clip 318 are also visible in this view.

Figure 8:
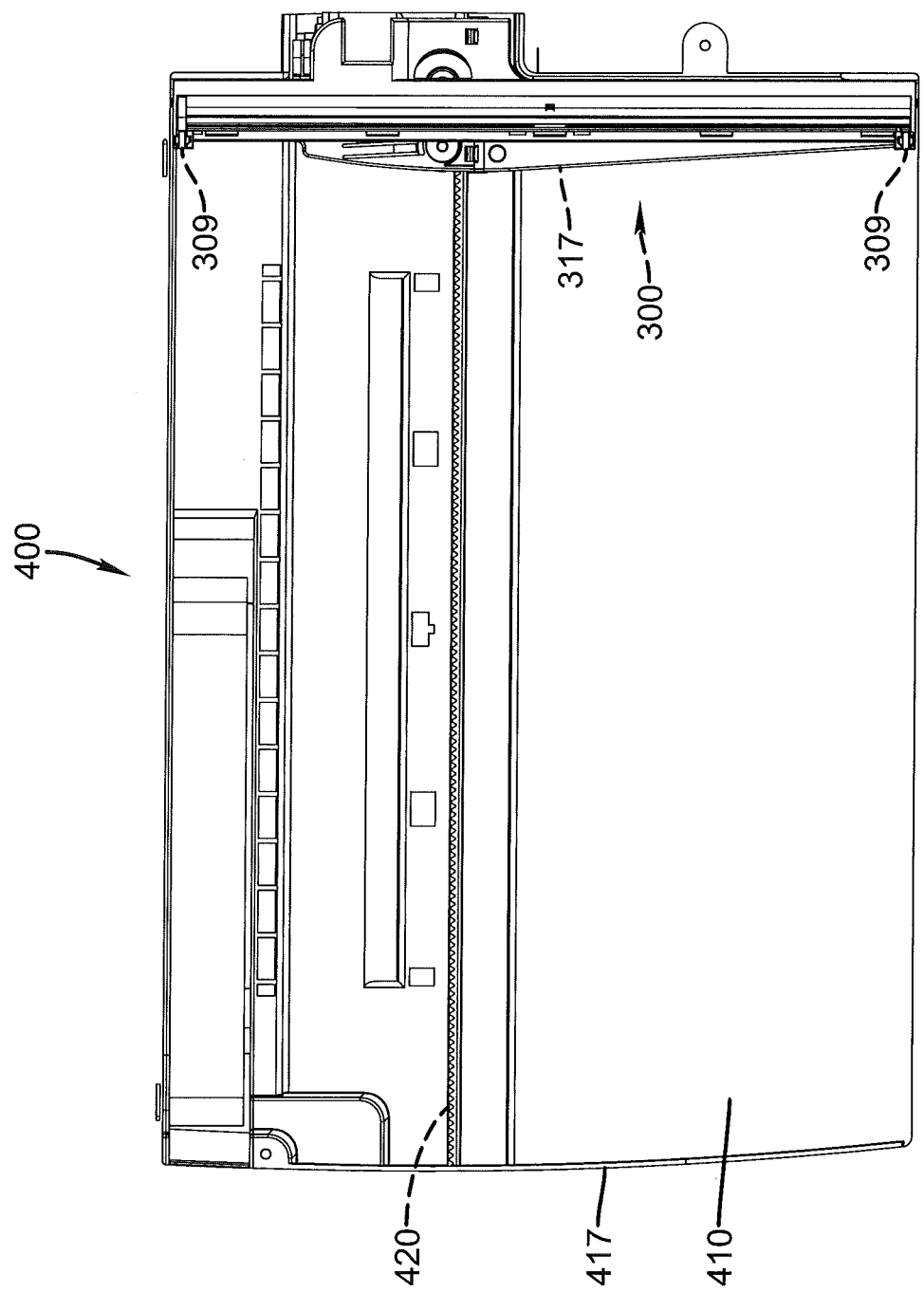
FIG. 8 is a top view of a portion of a scanner unit including a scan bar assembly.
Figure 9:
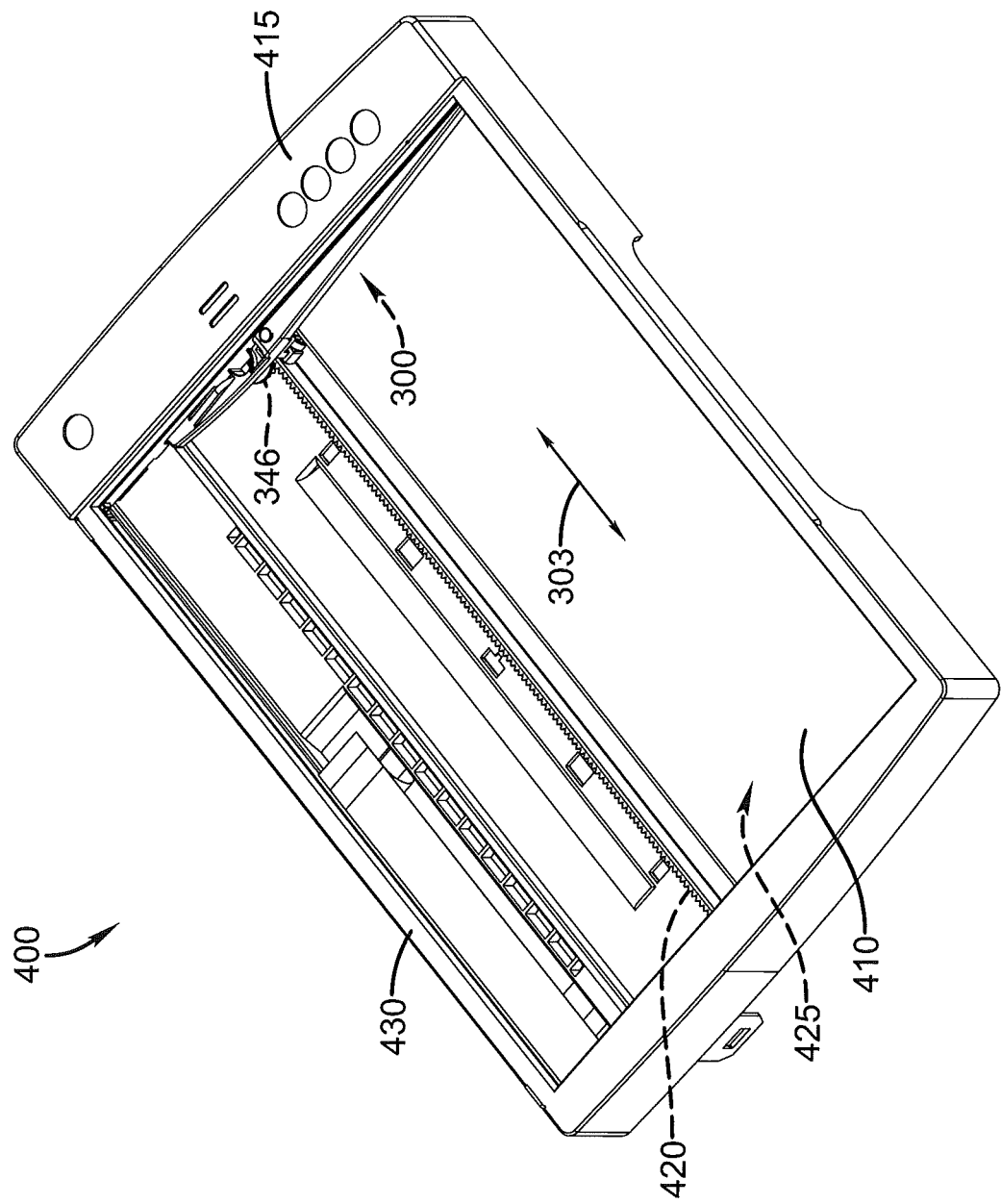
FIG. 9 is a perspective view of a portion of a scanner unit including a scan bar assembly.

FIG. 8 shows a top view and FIG. 9 shows a top perspective view of portions of scanner unit 400 with the lid removed so that more components are visible. Spacer wheels 309 (or other similar bearing features such as spacer pads) of scan bar assembly 300 are in contact with the bottom of transparent platen 410. Transparent platen 410 is held by holder 430 (see FIG. 9) of frame 425. Rack 420 extends across the floor of frame 425 of scanner unit 400. In FIG. 9 a portion of follower gear 346 is seen near rack 420. Control panel 415 (seen in FIG. 9 but removed in FIG. 8) is used to control functions (such as copying or scanning) of the imaging system 400. In this example, scanner unit 400 includes a curved side 417 that is able to curve inward toward its ends and still have scan bar assembly 300 fit next to curved side 417 due to the tapering of outer wall 317 of scan bar assembly 300. This inward curve allows a smaller footprint of scanner unit 400, and also provides an aesthetically pleasing look as an additional benefit.

Figure 10:
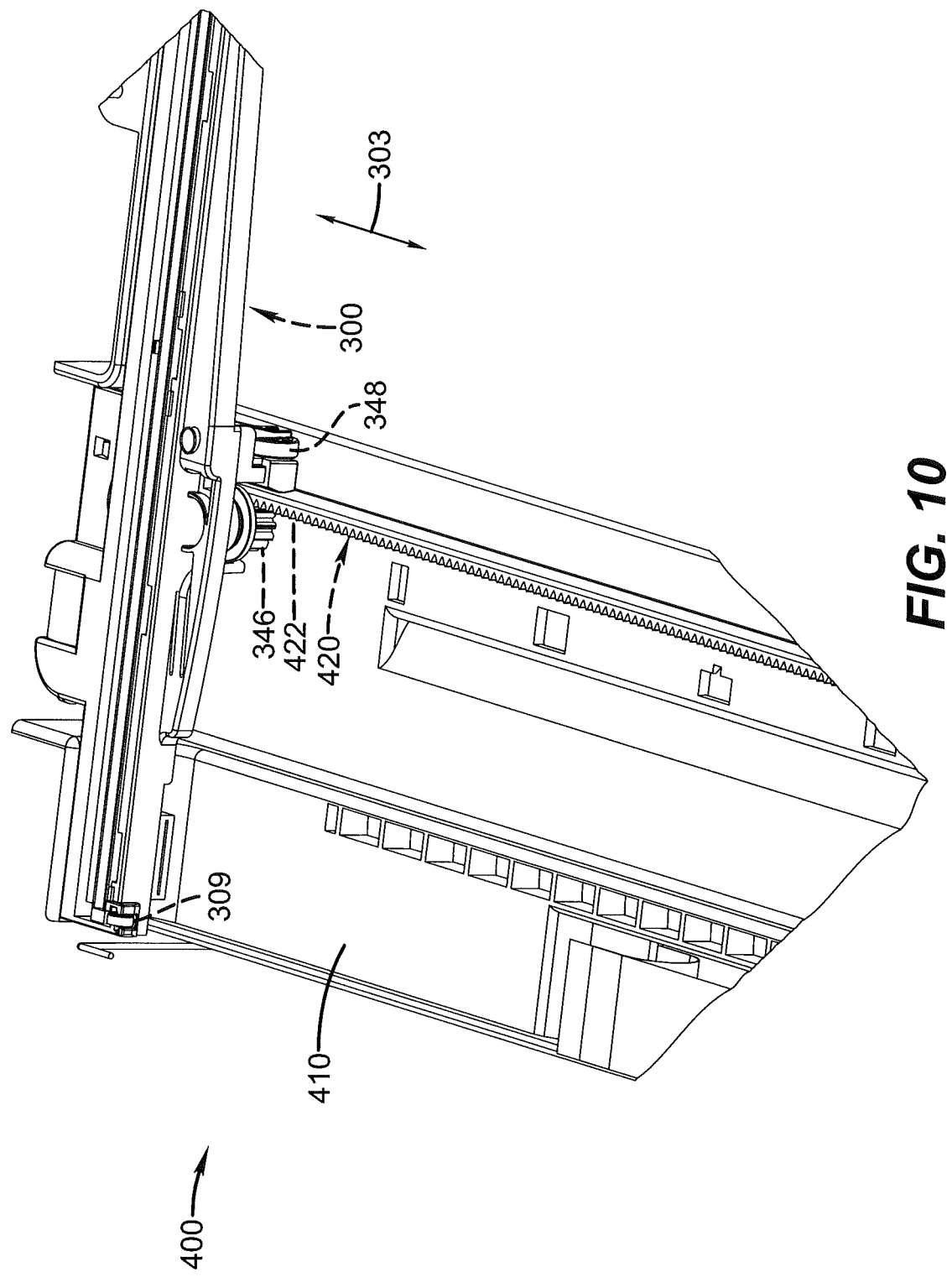
FIG. 10 is a close-up perspective view of a portion of a scanner unit including a scan bar assembly.

FIG. 10 shows a close up top perspective view of a portion of scanner unit 400. More clearly visible at this magnification and viewing angle is the engagement of follower gear 346 (of scan bar assembly 300) with rack teeth 422 of rack 420 that enables scan bar assembly 300 to move along scan direction 303. Rack teeth 422 are disposed along scan direction 303. The second gear of the drive gear driven by the motor mounted on the scan bar assembly is also engaged with the rack teeth, but it is not visible in the view of FIG. 10. Idle roller 348 is also shown riding on the floor of the frame 425 below transparent platen 410. A spacer wheel 309 is shown for contact with the underside of the transparent platen 410.

Figure 11:
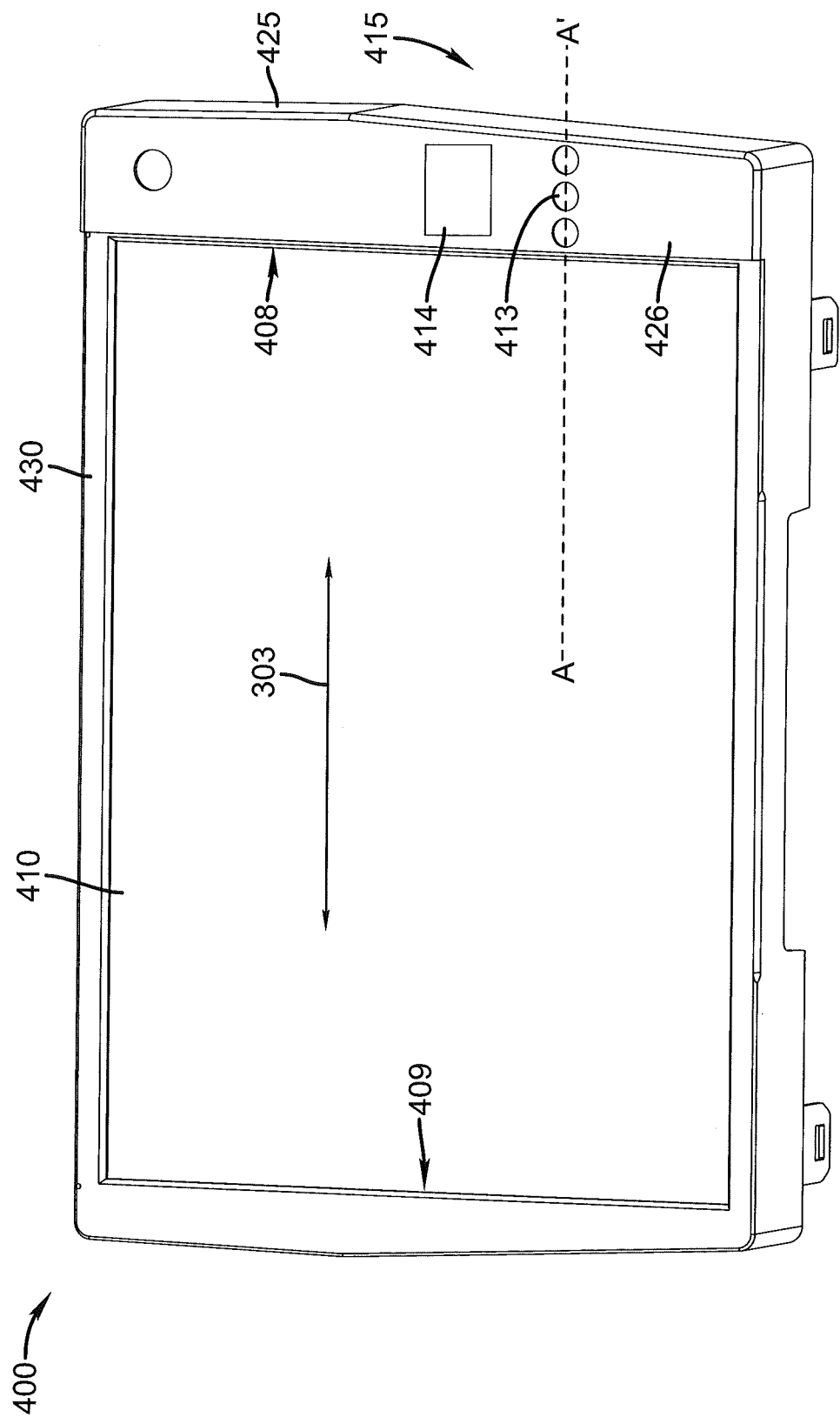
FIG. 11 is a top perspective view of a scanner unit.

FIG. 11 shows a top perspective view of scanner unit 400 in its operating position with components below transparent platen 410 hidden from view. Transparent platen 410 includes a first edge 408 and a second edge 409 that is opposite first edge 408, the first edge 408 and the second edge 409 being separated along scan direction 303. Frame 425 includes a holder 430 for transparent platen 410 and control panel 415. In this example, control panel 415 includes buttons 413 and display 414 and is located near first edge 408 of transparent platen 410 and on an uppermost surface 426 of frame 425.

Figure 12A:
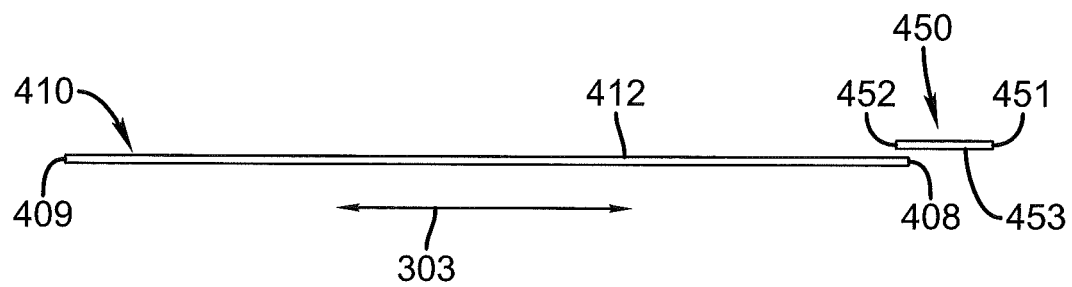
FIG. 12A is an end view and FIG. 12B is a top view of a transparent platen in overlapping relationship with a circuit board according to an embodiment of the invention.
Figure 12B:
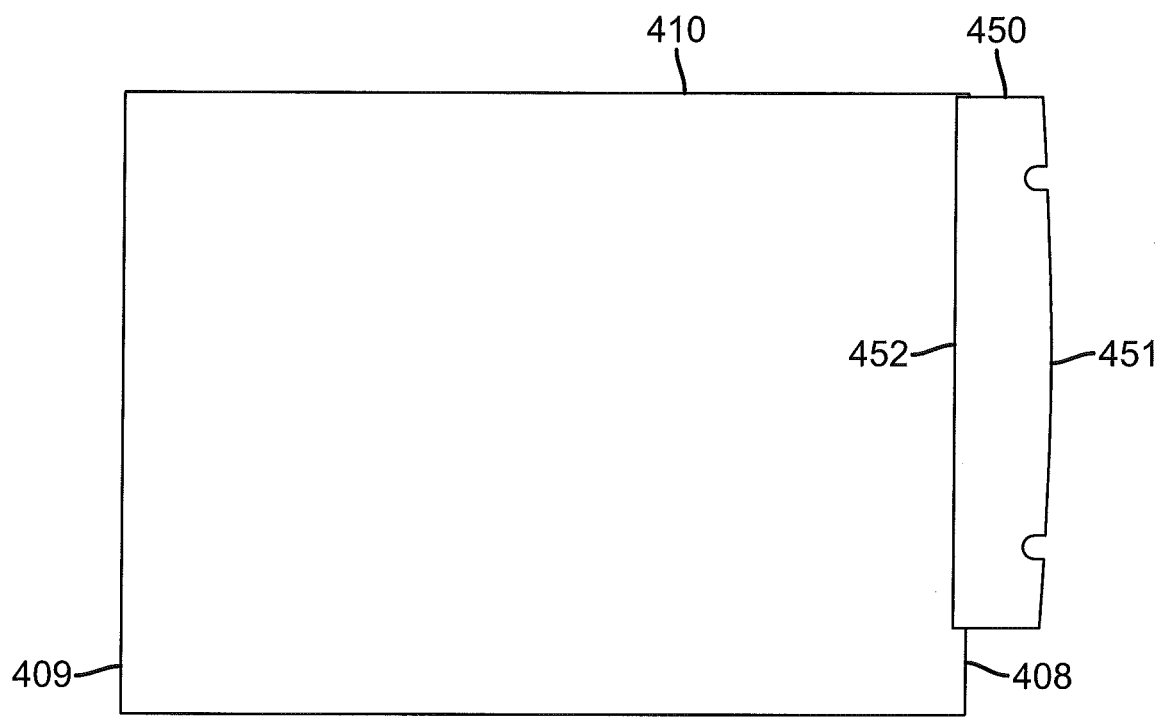

FIG. 12A shows an end view and FIG. 12B shows a top view of transparent platen 410 in overlapping relationship with a circuit board 450 that is connected to the control panel 415 (FIG. 11). Electrical components of circuit board 450 are hidden from view in FIGS. 12A and 12B. Circuit board 450 includes a first edge 451 and a second edge 452 opposite the first edge 451. Second edge 452 of circuit board 450 is configured to overlap the first edge 408 of transparent platen 408. A portion of surface 453 of circuit board 450 faces a portion of top surface 412 of transparent platen 410. The overlapping relationship of the first edge 408 of transparent platen 410 and the second edge 452 of circuit board 415 allows the width of the scanner unit 400 along scan direction 303 (FIG. 11) to be smaller than if the second edge 452 of circuit board 450 were separated by a gap along scan direction 303 as in conventional scanner units. First edge 451 of circuit board 450 is located adjacent the side of frame 425 that is near control panel 415, and the distance from first edge 451 to second edge 452 is made only as wide as needed in order to accommodate the electrical components. In some embodiments (as shown in FIGS. 12B and 13), the first edge 451 of circuit board 450 is curved similarly to the side of frame 425 in order to increase circuit board area while reducing the distance between first edge 451 and second edge 452.

Figure 13:
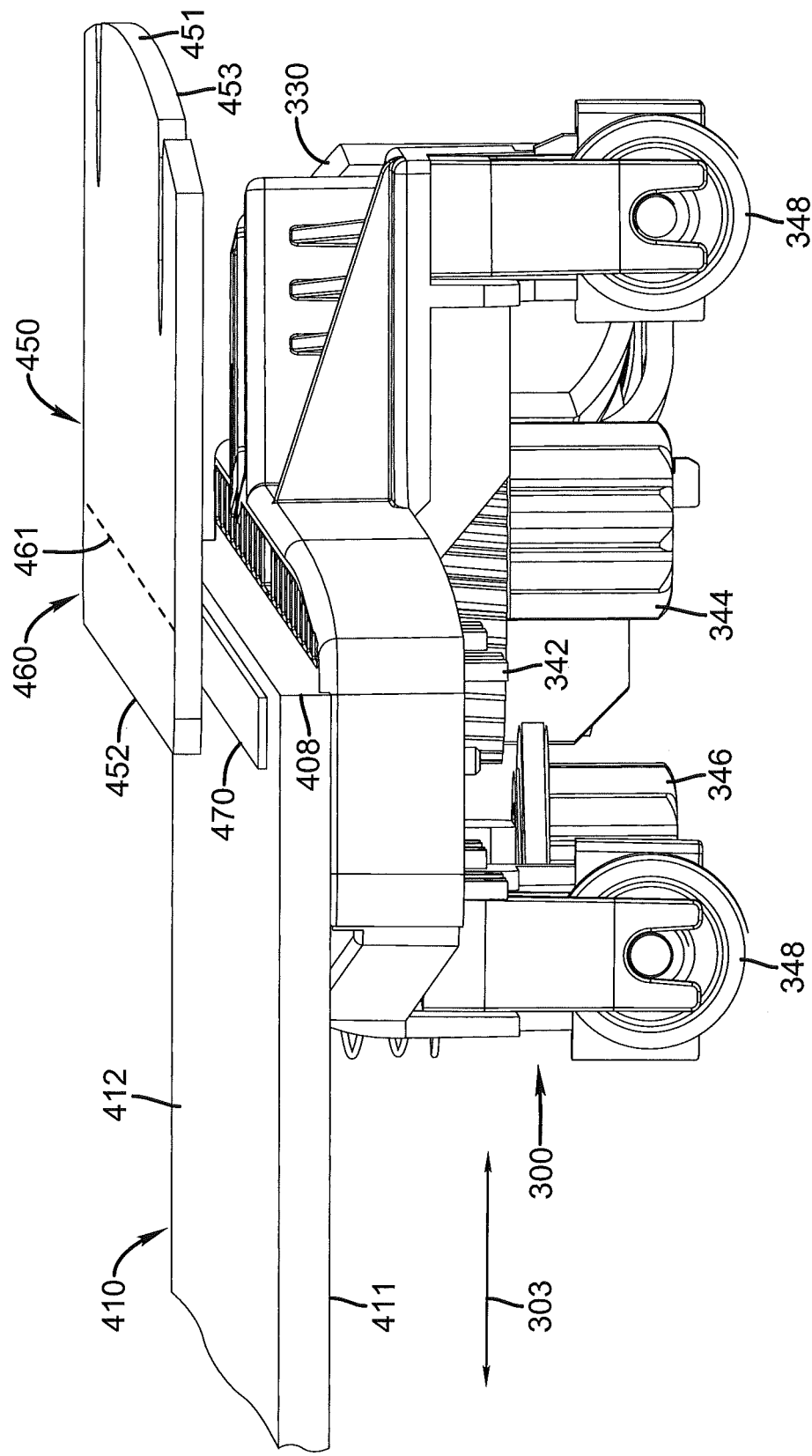
FIG. 13 is a close-up perspective view of a scan bar assembly and transparent platen in overlapping relationship with a circuit board according to an embodiment of the invention.
Figure 14:
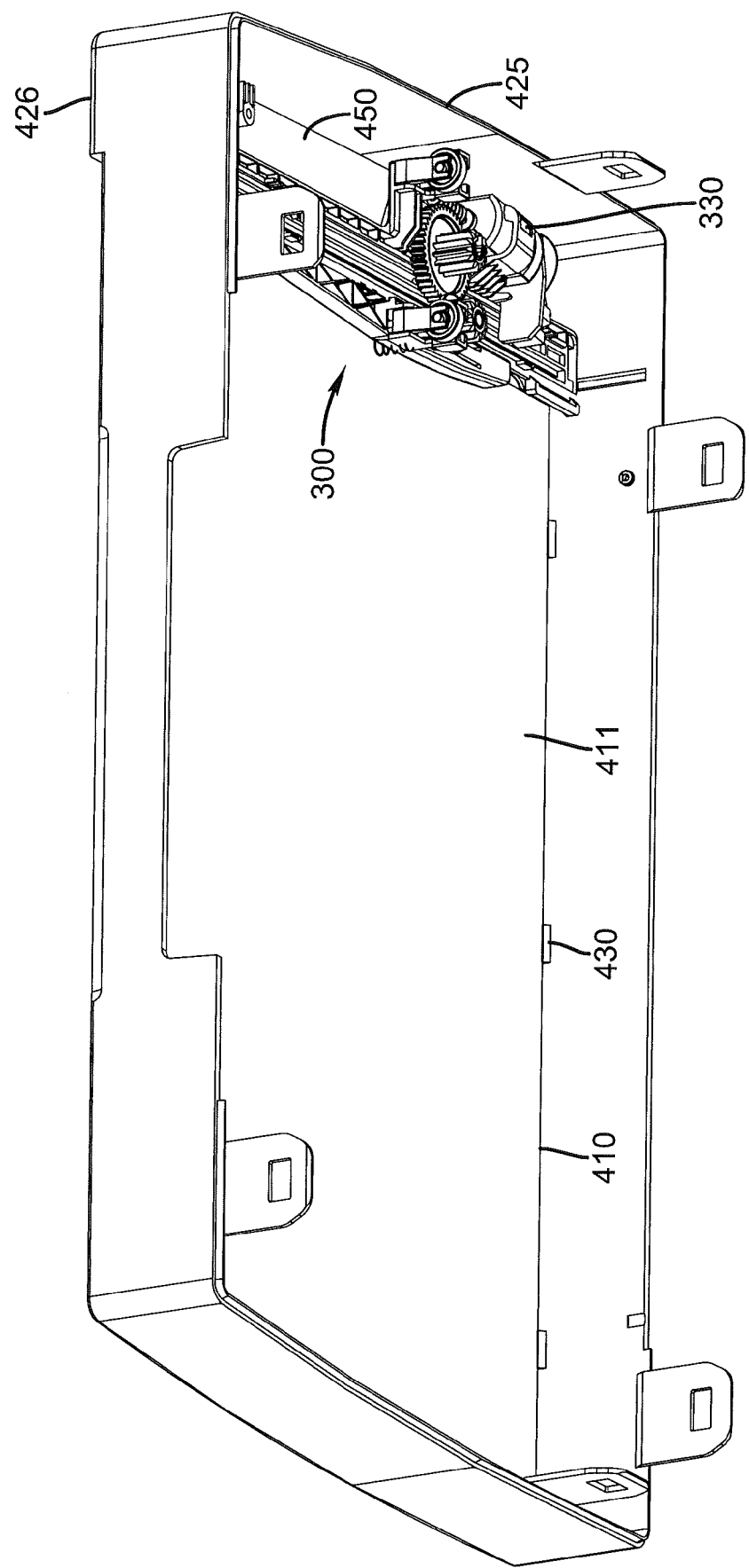
FIG. 14 is a bottom perspective view of a scanner unit according to an embodiment of the invention.

FIG. 13 shows a close-up perspective view of scan bar assembly 300 together with transparent platen 410 in overlapping relationship with circuit board 450. Scan bar assembly 300 is located at its end of travel toward the side of frame 425 that is adjacent to circuit board 450, as is also seen in top perspective view of FIG. 9 and the bottom perspective view of scanner unit 400 shown in FIG. 14. Both the scan bar assembly 300 and the transparent platen 410 are in overlapping relationship with circuit board 450 in the example of FIG. 13. FIG. 14 shows transparent platen 410 being held by holder 430 of frame 425 by means of tabs extending inward from frame 425. Scan bar assembly 300 has similar components to those described above relative to FIGS. 3-7.

Also shown in FIG. 13 is a white reference member 470 for the scan element of scan bar assembly 300 to be optically calibrated against. White reference member 450 is typically located near the first end 408 of transparent platen 410. White reference member 470 can be an opaque white region on upper surface 411 of transparent platen 410 (outside the region where items are scanned), or it can be suspended by the frame (not shown in FIG. 13). In either instance it can be said that white reference member 470 is located between transparent platen 410 and circuit board 450 in a region of overlap 460 that is described in further detail below.

Figure 15:
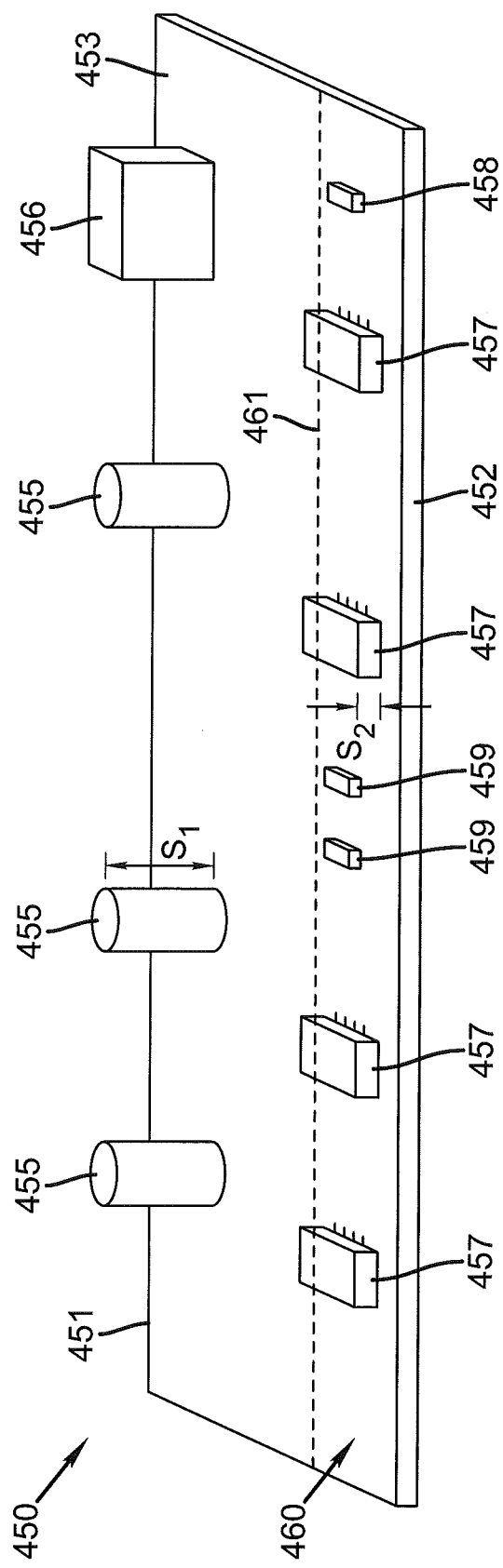
FIG. 15 is a schematic view of a circuit board according to an embodiment of the invention.

FIG. 15 is a schematic example of a circuit board according to an embodiment of the invention. A plurality of electrical components is shown extending from surface 453 of circuit board 450. The view of circuit board 450 in FIG. 15 is flipped upside down and also rotated relative to FIG. 13, so that the electrical components can be seen more clearly. The electrical components have different heights. In order to allow overlap between second edge 452 of circuit board 450 and first edge 408 of transparent platen 408 (FIGS. 12A and 13) without requiring a large distance between surface 453 of circuit board 450 and top surface 412 of transparent platen 410, a first set of taller electrical components is located near first edge 451, while a second set of shorter electrical components is located near second edge 452 of circuit board 450. Overlap boundary 461 between first edge 408 of transparent platen 410 and circuit board 450 is indicated as a dashed line so that the portion of circuit board 450 located between overlap boundary 461 and second edge 452 of circuit board 450 is the region of overlap 460.

Taller electrical components can include electrolytic capacitors 455 and connector 456, as in the example of FIG. 15 where an electrolytic capacitor 455 extends a distance $s_1$ from surface 453 of circuit board 450. Shorter electrical components can include integrated circuits 457, chip resistors 458 and chip capacitors 459. Integrated circuit 457 extends a distance $s_2$ from surface 453 of circuit board 450, where $s_2$ is less than $s_1$. The distance between surface 453 of circuit board 450 and top surface 412 of transparent platen 410 is S, as indicated in the schematic cross-sectional view (along A-A' of FIG. 11) of FIG. 16. Taller electrical components extending a distance, such as $s_1$, that is greater than S need to be located outside of the region of overlap 460, and closer to first edge 451 of circuit board 450. Shorter electrical components extending a distance, such as $s_2$, that is less than S can be located anywhere on the circuit board 450. However, at least some of the shorter electrical components tend to be located closer to second edge 452 in the region of overlap 460, in order to make room for the taller electrical components outside the region of overlap. An exemplary range of values for the distance S between surface 453 of circuit board 450 and top surface 412 of transparent platen 410 in region of overlap 460 is between two mm and ten mm.

Figure 16:
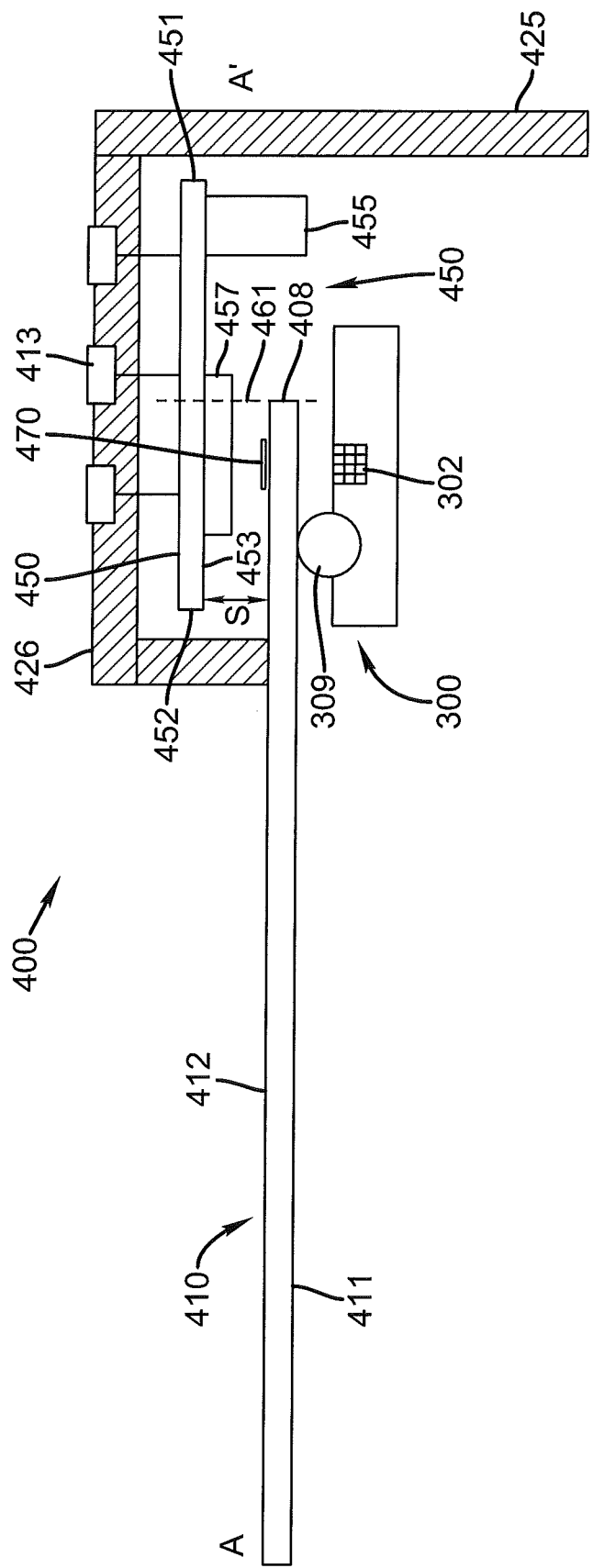
FIG. 16 is a schematic cross-sectional view along A-A' of FIG. 11, according to an embodiment of the invention.

The cross-sectional view of FIG. 16 indicates other spatial relationships between various parts of the scanner unit 400. Connections between buttons 413 and circuit board 450 are indicated by vertical lines. A short electrical component (integrated circuit 457) is indicated in region of overlap 460, while a tall electrical component (electrolytic capacitor 455) is located near first edge 451 of circuit board 450. A portion of transparent platen 410 extends beyond an inner edge of frame 425. Scan bar assembly 300 includes at least two bearing features, such as spacer wheel 309, that contact underside 411 of transparent platen 410. Spacer wheel(s) 309 can be located further from the first edge 408 than scan element 302 is (as shown in FIG. 16). Alternatively, spacer wheel(s) 309 can be located closer to the first edge 408 than scan element 302 is, or the spacer wheel(s) 309 can be collinear with scan element 302. At its end of travel, scan bar assembly 300 is underneath frame 425 in a region where circuit board 450 overlaps transparent platen 410, and bearing surfaces such as spacer wheel 309 contact transparent platen 410 in the region of overlap. Scan bar assembly 300 has an end of travel located underneath frame 425 for several reasons. First of all, it is desired to scan items, such as documents, all the way to the edge of the frame 425 while the scan bar assembly is moving, and then the scan bar assembly needs to decelerate to a stop. Extra scan lines can be acquired by scan element 302 as scan element goes beyond the edge of frame 425 in order to reduce optical fringing effects due to diffraction. In addition, the white reference member 470 is typically located under frame 425 for calibration of scan element 302. Because the bearing features, such as spacer wheel 309, need to stay in contact with the underside of transparent platen 410, the overlap between transparent platen 410 and circuit board 450 is such that circuit board 450 is located closer to uppermost surface 426 of frame 425 than transparent platen 410 is.

Scanner unit 400 can be a stand-alone scanner of an imaging system. Alternatively an imaging system can also include a printing mechanism as part of a multifunction printer. FIG. 17 shows a top view of an inkjet printing mechanism 500 that can be part of an imaging system together with scanner unit 400. Some of the parts of the printing mechanism 500 have been hidden in the view shown in FIG. 17 so that other parts can be more clearly seen. Paper (not shown) is advanced by paper advance motor 586 along paper advance direction 504. Printing mechanism 500 has a print region 503 across which carriage 520 is moved back and forth in carriage guide direction 505, while drops are ejected to print an image using printhead 550 that is mounted on carriage 520. Multichamber ink tank 562 and single chamber ink tank 564 are mounted in a holding receptacle of printhead 550. Carriage motor 580 moves belt 584 to move carriage 520 along carriage guide 582. For an imaging system including both a scanner unit 400 and a printing mechanism 500, functions including copying, scanning and printing can all be performed. Optionally such an imaging system is connected to a host computer (not shown).

Advantageously, according to embodiments of the invention whether in a standalone scanner or as part of a multifunction printer, configurations of the platen and the printed circuit board provide the required scanning area as well as contact regions near the end of travel for the wheels or other bearing features of the scan module, while enabling a reduced width of the scanning apparatus.

PARTS LIST

120 Scanner
122 Platen
124 Carriage
125 Bolt
126 Wheel
127 Gear retainer tab
128 Bias
130 Drive
132 Light source
134 Reflected light capture unit
135 Scanner module
144 Top surface
152 Surface
158 Scan direction
200 Central portion
202 Side portion
204 Body
206 Well
210 Cap
214 Wheel 216 Stationary surface
220 Motor
221 Motor printed circuit board
224 Worm gear
225 Gear
226 Pinion gear
228 Pinion gear
230 Rack
300 Scan bar assembly
301 Length direction
302 Scan element
303 Scan direction
304 Printed circuit board (for scan element 302)
306 Light source
308 Lens
309 Spacer wheel
310 Housing
311 First wall
312 Mounting region
313 Second wall
314 First mounting member
315 Gear retaining member
316 Second mounting member
317 Outer wall
318 Clip
320 Gear retention member
322 Cantilevered arm
324 End
326 Roller mount extension
328 Support (for motor PC board 334)
330 Motor
332 Axle
333 Encoder sensor
334 Slot
335 Printed circuit board (for motor 330)
336 Outermost side
337 Innermost side
338 Worm gear
340 Drive gear
342 First gear
344 Second gear
346 Follower gear
348 Idle roller(s)
400 Scanner unit
408 First edge (of transparent platen)
409 Second edge (of transparent platen)
410 Transparent platen
411 Underside (of transparent platen)
412 Top surface (of transparent platen)
413 Button
414 Display
415 Control panel
417 Curved side
420 Rack
422 Rack teeth
425 Frame
426 Uppermost surface (of frame)
430 Holder
450 Circuit board
451 First edge (of circuit board)
452 Second edge (of circuit board)
453 Surface (of circuit board)
455 Electrolytic capacitor
456 Connector
457 Integrated circuit
458 Chip resistor
459 Chip capacitor
460 Overlap region
461 Overlap boundary
470 White reference member
500 Printing mechanism
503 Print region
504 Paper advance direction
505 Carriage guide direction
520 Carriage
550 Printhead
562 Multichamber ink tank
564 Single chamber ink tank
580 Carriage motor
582 Carriage guide
584 Belt
586 Paper advance motor

The invention claimed is:

1. A scanning apparatus comprising:
a transparent platen including a first edge and a second edge opposite the first edge, the first and second edges being separated along a scan direction;
a frame including:
a holder for the transparent platen; and
a control panel located proximate the first edge of the transparent platen;
a scan bar assembly including a scan element;
a motor for moving the scan bar assembly along the scan direction; and
a circuit board connected to the control panel, the circuit board including:
a plurality of electrical components;
a first edge located adjacent a side of the frame; and
a second edge opposite the first edge, wherein the second edge of the circuit board is configured to overlap the first edge of the transparent platen.

2. The scanning apparatus of claim 1, the frame including an uppermost surface when the scanning apparatus is in operating position, wherein the circuit board is located closer to the uppermost surface than the transparent platen is.

3. The scanning apparatus of claim 2, wherein the control panel is located on the uppermost surface of the scanning apparatus.

4. The scanning apparatus of claim 3, wherein the control panel includes a display.

5. The scanning apparatus of claim 1, the plurality of electrical components including a first component that extends a first distance from a surface of the circuit board and a second component that extends a second distance from the surface of circuit board, the second distance being less than the first distance, wherein the first component is located proximate the first edge of the circuit board and wherein the second component is located proximate the second edge of the circuit board.

6. The scanning apparatus of claim 5, the second component being an integrated circuit.

7. The scanning apparatus of claim 5, the first component being one of a first set of components extending a distance from the surface of the circuit board that is greater than a predetermined distance, wherein the first set of components is located proximate the first edge of the circuit board.

8. The scanning apparatus of claim 6, wherein the first set of components includes a capacitor.

9. The scanning apparatus of claim 6, wherein the first set of components includes a connector.

10. The scanning apparatus of claim 5, the first component being one of a first set of components extending a distance from the surface of the circuit board that is greater than a predetermined distance, wherein none of the first set of components is located in a region where the circuit board overlaps the transparent platen.

11. The scanning apparatus of claim 1, wherein a surface of circuit board is separated from a facing surface of the transparent platen by a distance between two mm and ten mm in a region where the circuit board overlaps the transparent platen.

12. The scanning apparatus of claim 1, the scan bar assembly further comprising at least two bearing features that contact an underside of the transparent platen.

13. The scanning apparatus of claim 12, wherein the at least two bearing features contact the transparent platen in a region where the circuit board overlaps the transparent platen when the scan bar assembly is located at one end of its travel.

14. The scanning apparatus of claim 1 further including a white reference member located proximate the first end of the transparent platen.

15. The scanning apparatus of claim 14, wherein at least a portion of the white reference member is located between the transparent platen and the circuit board in a region where the circuit board overlaps the transparent platen.

16. The scanning apparatus of claim 1, the frame further comprising a rack having a row of rack teeth disposed along the scan direction.

17. The scanning apparatus of claim 16, the motor being mounted on the scan bar assembly, the scan bar assembly further comprising a gear engaged with the rack teeth of the frame.

18. A multifunction printer including:
a scanning apparatus comprising:
    a transparent platen including a first edge and a second edge opposite the first edge, the first and second edges being separated along a scan direction;
    a frame including:
        a holder for the transparent platen; and
        a control panel located proximate the first edge of the transparent platen;
    a scan bar assembly including a scan element;
    a motor for moving the scan bar assembly along the scan direction; and
    a circuit board connected to the control panel, the circuit board including:
        a plurality of electrical components;
        a first edge located adjacent a side of the frame; and
        a second edge opposite the first edge,
    wherein the second edge of the circuit board is configured to overlap the first edge of the transparent platen; and
a printing apparatus.

19. The multifunction printer of claim 18, the printing apparatus comprising a printhead and a carriage for conveying the printhead across a print region.

20. The multifunction printer of claim 18, the frame further comprising a rack having a row of rack teeth disposed along the scan direction.

21. The multifunction printer of claim 20, the motor being mounted on the scan bar assembly, the scan bar assembly further comprising a gear engaged with the rack teeth of the frame.

* * * * *